Oct. 9, 1934.　　T. B. MUNROE ET AL　　1,976,684
STRUCTURAL MATERIAL
Filed Nov. 11, 1930
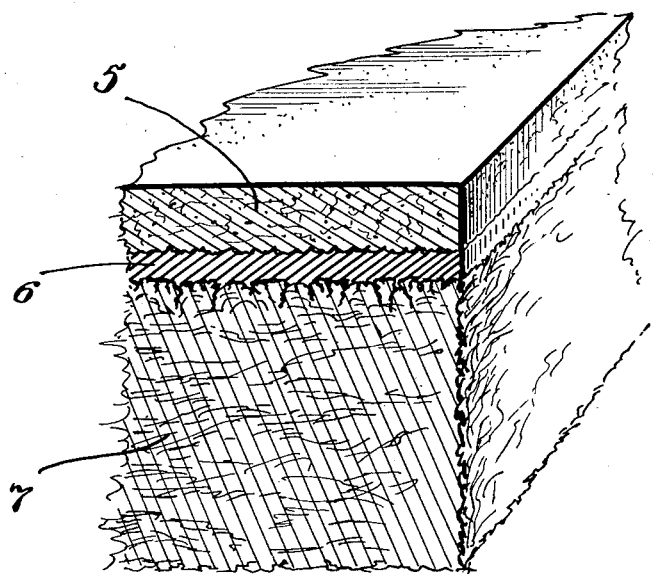
Inventors
T. B. Munroe &
By　G. E. Swenson
Attorney Patented Oct. 9, 1934

1,976,684

UNITED STATES PATENT OFFICE 1,976,684

STRUCTURAL MATERIAL

Treadway B. Munroe, Chicago, and George E. Swenson, Glencoe, Ill., assignors to The Celotex Company, Chicago, Ill., a corporation of Delaware Application November 11, 1930, Serial No. 494,983

4 Claims. (Cl. 154—2)

This invention relates particularly to a new and improved structural material, a material comprising a composite board-like member having portions of differing characteristics, and also relates to new and improved methods of the manufacture of such material. The composite board-like material comprises essentially a facing portion of relatively hard and incombustible nature such as asbestos cement with a body portion of sheeted insulating material such as one of the well known insulating boards made from sugar-cane, wood, and other like fibres.

The particular objects of this invention are to provide a composite structural material such as above described in which the surfacing and body portions are secured together by means of a waterproof adhesive, and to provide a new and improved process of manufacture of the composite board material wherein instead of making the facing and body portions as finished products later adhesively secured together, they are instead secured together prior to the completion of the manufacture of the component elements thereof. Other objects of the invention are to provide the composite board-like material described having substantially integrally united therein an insulating body portion and a hard dense incombustible and wear resisting surfacing material in which the body material and surface material are securely bonded together by an adhesive which constitutes a waterproof and vaporproof protection for the insulating material which is of such physical properties that there is no tendency for the different parts of the composite material to separate one from the other under varying conditions of temperature and the like.

Still other and further objects of the invention such as the new and improved process for the manufacture of the composite material together with many other minor features of and advantages of the product and its process of manufacture will be apparent from consideration of the following descriptive matter.

The composite boardlike structural material disclosed in the drawing comprises a cementitious facing sheet indicated at 5 which sheet may comprise an asbestos and Portland cement mixture, asbestos and magnesite cement, or it may comprise any other cementitious non-combustible material which is capable of being formed preferably in a wet state as a relatively thin sheet. The waterproof adhesive which adhesively secures together the facing and body sheets of the composite material is indicated at 6 and the insulation portion comprising sheeted fibrous material is indicated at 7.

In the manufacture of the composite material a dry or fully manufactured sheet of fibrous insulation material such as 7 has applied to the face thereof a thin coating of waterproof adhesive and preferably one having a fully blown asphaltic base, and then there is applied to the coating of adhesive a wet sheet of for example an asbestos and cement facing material which sheet has merely been formed but has had no other operations of manufacture applied thereto.

The built up composite sheet of material is placed in a press and, on the application of pressure, excess moisture is pressed out of the asbestos and cement sheet 5, the sheet is compacted, and due to the applied pressure the surface thereof adjacent the insulation sheet is firmly forced into contact therewith and into the various irregularities, crevices, and the like of the face thereof. After the composite structural material as described has taken its initial set, the sheet is removed from the press and is appropriately stored for the proper curing of the asbestos cement surfacing sheet.

It is, of course, to be understood that the waterproof adhesive may be applied to both sides of the body portion of the composite material and that the sheet of asbestos and cement may be secured to both sides in the same manner as described in the securing of the facing material to one side of the body material, and that both of these facing sheets are secured to the body sheet in a single operation; that is, both of the facing sheets are applied, and then the composite sheet is placed under the press to be compacted and to set.

It is, of course, to be understood that the body sheet which has been described as a sheet of fibrous insulation material may comprise sheeted cork particles or granules or substantially any form of relatively light, porous thermal insulation material which has sufficient rigidity so that its thermal insulation will not be appreciably decreased by the application of the pressure necessary for the compacting of or bringing into intimate association the facing sheet and body sheet.

The composite sheet of structural material may also be made, if the appropriate machinery for the manufacture of the components thereof are associated, by applying to a surface of a wet sheet of the insulating material the coating of waterproof adhesive with the application of the wet sheet of asbestos and cement thereto. In referring to a wet sheet of the insulating body material there is meant the formed sheet thereof which is ordinarily produced from a pulp by a process analogous to that used for the manufacture of paper sheets, which wet sheet ordinarily contains at least 50% of moisture prior to its being dried to produce the finished dry sheet of insulating material. The provision of the coating of waterproof adhesive between the body and facing sheets affords a water stop, which prevents water from passing from the facing sheet to the body sheet or vice versa, and therefore the normal steps of the conditions of manufacture of neither are interfered with.

The product produced as above described has extremely marked superiority over the same composite sheet made up from completed elements that is, made up from sheets of fully manufactured insulating material, and asbestos and cement facing sheets since by combining the components with at least one of them in the raw or unfinished condition the sheets are forced into intimate contact when the uniting pressure is applied thereto so that the adhesive is substantially uniformly distributed over the entire surfaces and the wet sheet is caused to on its back side conform to all the irregularities of its complementing sheet whereby the most intimate association is obtained. A quite important advantage of the product and process described is that a relatively thin sheet of the facing material may be used which is practically impossible if a finished facing sheet should be used because the finished facing material, would, particularly in thin sheets, as it is quite brittle break very readily in handling. As distinguished from the use of sheets of finished facing material the sheets of wet facing material may readily be handled as they come off the sheeting machine as means for running them directly onto the base sheets of insulating material are well known and even should the wet facing sheet be somewhat broken or torn the succeeding step wherein the material is pressed will reunite the broken places so that the places where they occurred cannot be distinguished.

By the use of a somewhat flexible adhesive between the face sheet and the base sheet of the composite material allowance is made for relative expansion and contraction and, further, due to the fact that the face sheet comprises a relatively thin and therefore somewhat resilient material which will give when stresses are transmitted from the face sheet to the base sheet through the adhesive, there is no tendency for the component parts of the sheet to separate one from the other.

It is obvious that those skilled in the art may vary the steps and combinations of steps constituting the process as well as vary the materials and arrangements thereof constituting the product, all within the scope of this invention without departing from the spirit of the invention, and therefore it is not desired to be limited to the foregoing except as may be required by the claims.

What is claimed is:—

1. The process of manufacture of a composite structural material wherein there is applied to a surface of sheeted heat insulating material a flexible waterproof adhesive, and on which there is placed a wet preformed facing sheet of cementitious material having fibres incorporated therein, with the subsequent application of pressure, whereby the facing sheet is compacted, pressed into intimate association with the body sheet, and allowed to take its initial set prior to removal from subjection to press pressure.

2. The method of manufacture of a composite structural material wherein a preformed wet, freshly manufactured sheet of asbestos cement board is applied to a body member of sheeted heat insulating material, there being provided between the contacting faces of the facing material and body material a thin coating of flexible waterproof adhesive, the composite structure subjected to press pressure to force the facing sheet and body sheet into intimate contact, the press pressure maintained on the composite material until the facing sheet has taken its initial set, the composite material then removed from subjection to press pressure and allowed to cure.

3. The method of manufacture of a composite structural material wherein a wet freshly manufactured fibrous cement-containing sheet is applied to a wet manufactured heat insulating sheet, there being provided between the contacting faces of the cement-containing sheet and the insulating sheet a thin coating of waterproof adhesive, the composite structure subjected to press pressure to force the facing sheet and body sheet into intimate contact, the press pressure maintained on the composite material until the facing sheet has taken its initial set.

4. The method of manufacture of a composite structural material wherein a wet freshly felted fibrous cement-containing sheet is applied to a wet fibrous felted heat insulating sheet, there being provided between the contacting faces of the cement-containing sheet and the insulating sheet a thin coating of flexible waterproofing adhesive, the composite structure subjected to press pressure to force the facing sheet and body sheet into intimate contact, the press pressure maintained on the composite material until the facing sheet has taken its initial set, the composite material then removed from subjection to press pressure and allowed to cure.

GEORGE E. SWENSON.
TREADWAY B. MUNROE.